Jan. 2, 1962
J. D. REPKO
3,015,766
VARIABLE CAPACITOR
Filed Feb. 26, 1959
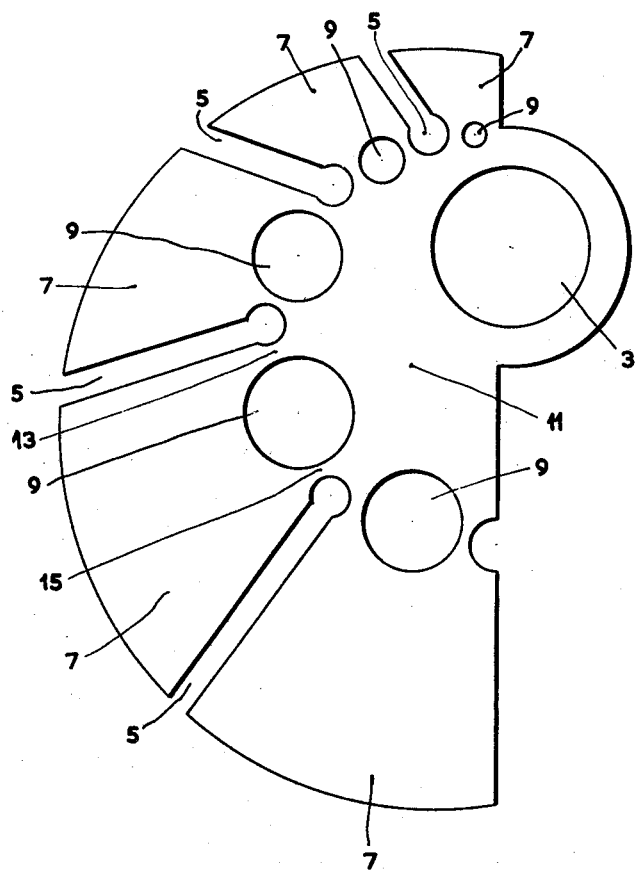
INVENTOR
JAN DIRK REPKO
BY
AGENT

United States Patent Office 3,015,766
Patented Jan. 2, 1962

3,015,766
VARIABLE CAPACITOR
Jan Dirk Repko, Eindhoven, Netherlands, assignor to North American Philips Company, Inc., New York, N.Y., a corporation of Delaware
Filed Feb. 26, 1959, Ser. No. 795,795
Claims priority, application Netherlands Mar. 29, 1958
1 Claim. (Cl. 317—253)

This invention relates to a variable capacitor having at least one set of plates secured to the rotor shaft at right angles thereto, at least one of the two outer plates of this set being provided with substantially radial edge slits so that wings are produced which can be bent. The outer plates (end plates) with bendable wings are generally used at present in multiple capacitors in order to match the capacitance variations of at least two capacitor sections to one another or, for example, to a previously chosen scale graduation. This is effected by individual bending of the, for example, five wings of the end plate; in general this provides a matching of the capacitance variation as a function of the angle of rotation which is sufficient in practice.

The edge slits in the end plates cannot extend up to the rotor shaft, since a plate portion around the shaft, which is not weakened by slits, is required for the attachment of the plate to the shaft. Consequently, when each wing is bent, the slitless plate portion is also slightly bent so that the wings adjacent the intentionally bent wing may change their positions (herein referred to as secondary bending). Thus, the positions of the wings which were the first to be adjusted are not maintained with certainty and this is obviously undesirable.

It is an object of the invention to obviate this disadvantage and, according to the invention, this is ensured in that only the slit plate is provided with apertures situated between and/or adjacent the closed ends of the edge slits. "Secondary bending" of the adjacent wings is thus substantially obviated.

It should be noted that it is known to provide the rotor plates with apertures. Hitherto this has been done with a view to influencing the capacitance variation and consequently all the plates were provided with the desired apertures. The apertures to be provided in accordance with the invention in at most two end plates only, substantially do not influence the capacitance variation.

In order that the invention may readily be carried out, an embodiment thereof will now be described, by way of example, with reference to the accompanying drawing.

The attached drawing illustrates in plan view an end plate for a variable capacitor according to the invention.

The drawing shows an end plate 1 of a rotor for a variable capacitor in accordance with the invention. The plate 1 has an aperture 3 for the passage of the rotor shaft (not shown) and is provided with a number of substantially radial edge slits 5, that is to say slits extending towards the centre of the aperture 3 (which start at the edge and consequently are closed at one end only). By the provision of the edge slits 5 a number of bendable wings 7 are produced in plate by variation of the capacitance as a function of the angle of rotation can be made.

This adjustment or variation is effected by bending the free ends, that is to say, the outwardly extending ends of at least one wing 7 axially, that is to say, in a direction at right angles to the plane of the drawing from the plane of the plate. As has been described hereinbefore, it is of importance that in bending one wing adjacent wings are not slightly bent also. According to the invention, this is ensured in that provision is made, between the closed ends of the edge slits 5 facing the aperture 3, of preferably circular apertures 9 (the first and the last of the series of apertures 9 situated substantially on an arc of a half circle, are disposed adjacent one of the said ends). The apertures 9 weaken the connection between the wings 7 and the central non-slit portion 11 of the plate 1. Consequently, by suitably proportioning the apertures 9 the forces required to bend the wings are reduced to an extent such that permanent secondary bending of the portion 11 and consequently of adjacent wings is substantially obviated.

As has been mentioned hereinbefore, the wings 7 must be adapted to bend axially. Bending in other directions, for example tangentially, or such that the wing is effectively rotated about a radial axis must be precluded even with comparatively rough treatment. The construction described satisfies this requirement in that each wing is connected to the central plate portion 11 at two points or bridges 13 and 15 spaced apart as far as possible. It will be seen from the drawing that the resistance of the wings against bending in the mentioned above, undesirable directions is substantially increased by the provision of the bridges.

In a practical embodiment the minimum width of the plate portions 13 and 15 was from 0.4 mm. to 0.6. mm. with a plate thickness of 0.45 mm. The circular shape of the apertures 9 is of advantage since it provides gradual transition to the weakened portions 13 and 15. Thus the likelihood of local overloading and tearing of the plate during the bending process is reduced to a minimum.

From the above it will be appreciated that the drawing illustrates only the slit end plates of each rotorset. Since the set usually contains from 10 to 20 plates, the capacitance variation of the capacitor is substantially not affected by the provisions of the apertures 9.

What is claimed is:

A capacitor plate for a variable capacitor the improvement comprising a plurality of wing means defining a plurality of radially elongated slits extending from the outer periphery of said plate and each terminating in an aperture spaced from a shaft opening in said plate, a plurality of apertures located between the adjacent apertured ends of said radial slits and separated from said slits whereby each of said wings are connected to the uninterrupted portion of said plate located between said slits and said shaft opening by a pair of bridge means.

References Cited in the file of this patent
UNITED STATES PATENTS 2,123,050  Johnson _____ July 5, 1938

FOREIGN PATENTS 487,650  Great Britain _____ June 23, 1938
566,703  Great Britain _____ Jan. 10, 1945
620,024  Great Britain _____ Mar. 17  1949